United States Patent [19]
McWethy

[11] 3,743,331
[45] July 3, 1973

[54] SHAFT-TO-HUB COUPLING
[75] Inventor: Irvin E. McWethy, Oxford, Ohio
[73] Assignee: Philco-Ford Corporation, Philadelphia, Pa.
[22] Filed: Dec. 30, 1971
[21] Appl. No.: 214,078

[52] U.S. Cl. .............................. 287/53 R, 92/255
[51] Int. Cl. ............................................. F16d 1/06
[58] Field of Search ..................... 287/53 R, 20 P; 85/46, 32 CS; 151/14 CS; 92/255

[56] References Cited
UNITED STATES PATENTS
| 782,349 | 2/1905 | Marshall | 85/32 CS |
| 2,361,244 | 10/1944 | Smith | 287/20 P |
| 2,512,316 | 6/1950 | Eckener | 85/46 X |
| 3,177,782 | 4/1965 | Sampson | 287/125 |

Primary Examiner—Andrew V. Kundrat
Attorney—Robert D. Sanborn

[57] ABSTRACT

A shaft is coupled to a hub by means of a resilient, helical, wire coil threadedly received in matching grooves formed externally on a cylindrical shaft section and internally within a cylindrical opening in the hub. The land sections between respective grooves in the shaft section and in the hub opening are of substantial extent and closely engage one another. A tight, torque-transmitting coupling is afforded, which coupling is capable of ready assembly and disassembly.

5 Claims, 6 Drawing Figures

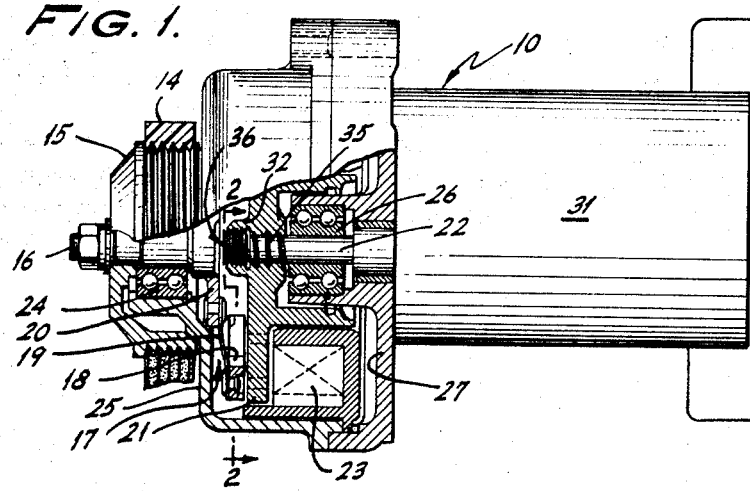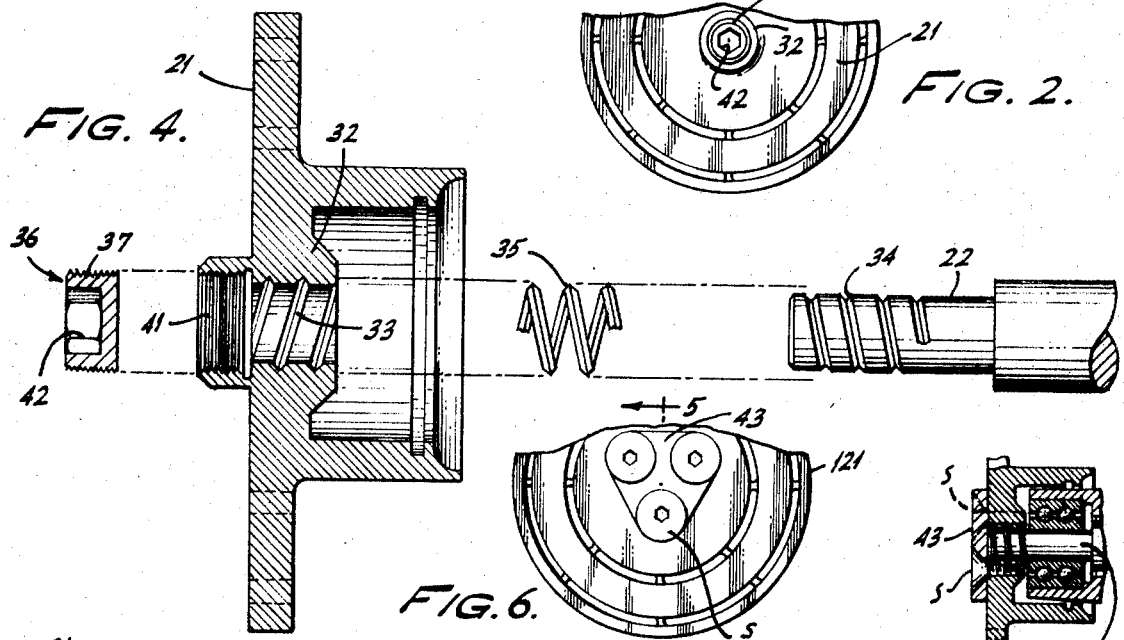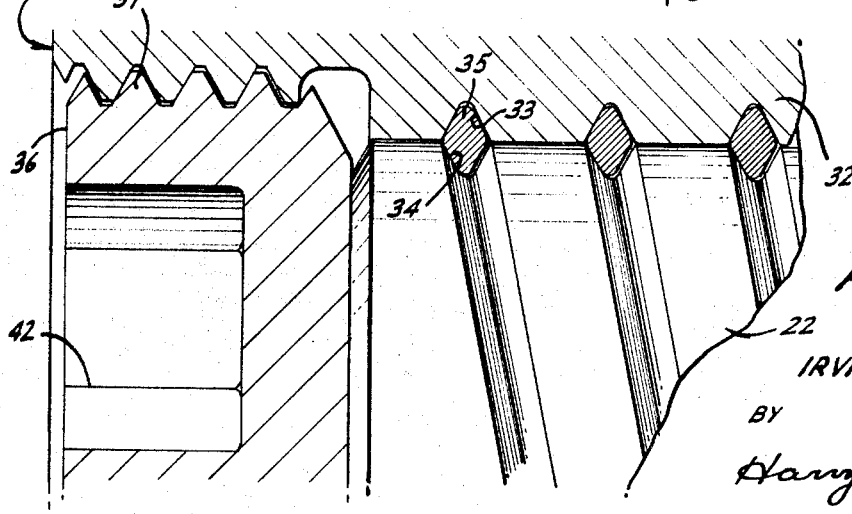

SHAFT-TO-HUB COUPLING

BACKGROUND OF THE INVENTION

This invention relates to shaft couplings for hubs or the like. The invention is particularly useful in the coupling of a rotational shaft with the hub of a clutch plate.

In the field of automotive air conditioning, for example, refrigerant compressors commonly are driven by the main engine through a belt and pulley arrangement. To modulate the refrigerating effect, one pulley drives the compressor main shaft through a clutch that typically includes a driven friction plate that is coupled to this shaft, and is both engageable and disengageable by a driving plate, in response to operation of a temperature sensing device. A drive arrangement of this type characteristically is subject to both pulsating and impact loads, with resultant subjection of contacting clutch plate hub and shaft regions to slight relative motions that are conducive to fretting corrosion, and possible resultant failure of the hub-to-shaft coupling.

It is a general objective of this invention to provide improved shaft-to-hub coupling means that substantially eliminates fretting corrosion, and facilitates both assembly and disassembly of the drive coupling between a rotational shaft and the hub of a rotating member.

SUMMARY OF THE INVENTION

In achievement of the foregoing as well as other objectives and advantages, the invention contemplates the provision, in a shaft-to-hub coupling, of a shaft having a generally cylindrical section provided with a helical groove, and a hub having a generally cylindrical opening receiving said shaft section and having a helical groove matching the helical groove in said shaft section. Both the grooved shaft section and the grooved hub opening include land surface areas of substantial extent disposed in close fitting engagement with one another, and a helical wire coil is threadedly received in said matching helical grooves to provide a self-tightening, torque transmissive threaded coupling between said shaft and said hub.

The manner in which the foregoing as well as other objectives and advantages of the invention may best be achieved will be more fully understood from a consideration of the following description taken in light of the accompanying drawing.

BRIEF DESCRIPTION OF THE DRAWING

FIG. 1 is an elevational showing of a portion of an automotive air conditioning apparatus embodying the invention, some parts being shown diagrammatically and others broken away for convenience, and illustrating elements of a clutch plate and the mode of attachment of its hub to a refrigerant compressor main shaft, in accordance with the invention;

FIG. 2 is a showing of a portion of the clutch plate as seen looking in the direction of arrows 2—2 applied to FIG. 1;

FIG. 3 is an enlarged, fragmentary, sectional showing of the clutch plate hub and shaft coupling seen in FIGS. 1 and 2;

FIG. 4 is an exploded view of the parts seen in FIG. 3; and

FIGS. 5 and 6 are, respectively, views similar to portions of FIG. 1 and FIG. 2, and illustrating a modification contemplated by the invention.

DESCRIPTION OF THE PREFERRED EMBODIMENTS

In FIG. 1 there is illustrated refrigeration apparatus of the automotive air conditioner type, and including a compressor 10, condenser 11, expansion valve 12, and evaporator 13 connected in conventional series refrigerant flow circuit. Compressor 10 is driven through a belt 14 coupled in known manner to the engine (not shown), and wrapped on a driven pulley 15 affixed to the stub shaft 16 of clutch drive plate means 17. The drive plate means 17 comprises an outer friction ring 18 supported in cantilever fashion on leaf springs 19 affixed to a flange 20 on stub shaft 16. The stub shaft 16 for drive plate means 17 is rotatably supported in a bearing 24 provided in the clutch housing 25, and the compressor main shaft 22 is rotatably supported in a suitable bearing 26 provided in an adjacent end wall 27 of the compressor housing 31. A driven clutch plate 21 is attached, in a novel and improved manner to be described below, to compressor main shaft 22. Clutch plate 21 is selectively engageable by friction ring 18 of drive plate means 17, through selective energization and de-energization of a solenoid of conventional design and designated generally by the numeral 23. It will be appreciated that springs 19 provide both for torque transmission between flange 20 and ring 18, and for axial movement of ring 18 in provision of its aforementioned selective engagement with clutch plate 21.

With reference also to FIGS. 2, 3 and 4, and in especial accordance with the invention, driven clutch plate 21 includes a hub 32 provided with an internal helical groove 33, and a corresponding portion of shaft 22 includes an external helical groove 34 matching the internal groove 33. A helical spring 35 is threaded into the matching grooves 33, 34, and, preferably in cooperation with stop means such as a threaded thrust plug 36, serves as the means by which plate 21 is fastened to shaft 22.

As is seen to advantage in FIGS. 3 and 4, a thrust plug 36 includes threads 37 received within suitably matching threads 41 formed in the left hand region of hub 32, as viewed in the drawing, and the end wall of plug 36 abuttingly engages the end of the shaft 22. As is best seen in FIG. 2, plug 36 is provided with a wrench-receiving recess 42 by which the plug may be rotated for axial movements in the hub 32. Axial positioning of plug 36 establishes and maintains the desired degree of axial extension of the threaded portion of shaft 22 into the threaded portion of the clutch plate hub. Considered another way, plug 36 serves as means disposed to react between shaft 22 and hub 32 for establishing and maintaining predetermined axial positioning of the threaded hub section on the threaded shaft section. In order to ensure against change of the desired preset plug position, the thread angles of the plug 36 and the helical spring 35 are the reverse of one another. Rotation of clutch plate 21 is in a direction tending to cause it to thread itself onto shaft 22, but further relative threading motion is prevented by abutting engagement of the end of shaft 22 with the flat end face of plug 36; the same rotation tends to cause plug 36 to thread itself into the hub 32. It will therefore be appreciated that clutch plate 17 is, in effect, locked onto shaft 22 as a result of the coaction of the above described threads. The clutch plate 21 may be readily removed from the shaft, such as may be desired when servicing, merely by rotating the plate relative to shaft 22 in a direction opposite to its normal direction of rotation.

As seen to further advantage in FIG. 3, helical grooves 33 and 34 preferably are of standard 60° thread form, and have a pitch of five grooves per inch. The grooves 34 in shaft 22 have a pitch diameter of about 0.450 inch, the diameter of the shaft in this region being about 0.500 inch. The grooves 33 in the 0.500 inch diameter opening in hub 32 have a pitch diameter of about 0.560 inch. The pitch angle is relatively low, being about 8° to 12°. Insert 35 is a helical spring, of generally diamond-shaped cross-section, and when in place affords a standard thread size of about 0.500 inch - five threads per inch, right-handed. In addition to threaded connection between the hub and shaft, it will be appreciated that the generally cylindrical, extended land areas between the grooves afford a precision fit that minimizes relative movements of a vibrational nature between the hub and the shaft. From the illustration in in FIG. 4, it will be appreciated that, for the sake of convenience of assembly, helical spring 35 can be wound either over or under size relative to the diameters of the connecting portion of shaft 22 and hub 32, so that the spring may be preassembled either to the hub or to the shaft.

Still with reference to FIGS. 3 and 4, the threads 37 of thrust plug 36, and the mating threads 41 of hub 32, are of standard 60° thread form, having a pitch diameter of about 11/16th inch, and comprise twelve left-handed threads per inch.

In the embodiment of the invention shown in FIGS. 5 and 6, axial movement of a clutch plate 121 along shaft 122, to which it is threadedly keyed, is prevented by a thrust plate 43, instead of a threaded plug, affixed to the clutch plate by screws S and positioned to extend over the threaded opening in the plate hub for abutting engagement with the end of shaft 122. An arrangement such as this may be desirable in an instance where axial adjustment of clutch plate 121 on shaft 122 need not be provided.

While in the illustrated embodiments of the invention the threaded shaft and hub sections are of generally cylindrical shape, it will be understood that these same sections may be slightly tapered while still affording threaded connection between the hub and shaft. Thus, the term "generally cylindrical" contemplates either form. These as well as other modifications are contemplated by the scope of the appended claims.

From the foregoing, it will be appreciated that the invention affords an improved shaft-to-hub coupling that substantially eliminates fretting corrosion, and facilitates both assembly and disassembly of the drive coupling between a rotational shaft and the hub of a rotatable member.

I claim:

1. In a shaft to hub coupling: a shaft having a generally cylindrical section provided with a helical groove and an end; means defining a hub having a generally cylindrical opening receiving said shaft section and having a helical groove matching the helical groove in said shaft section; each said shaft section and said hub opening including land areas of substantial extent between their respective grooves and disposed in close fitting engagement with one another; a helical wire coil threadedly received in said matching helical groove in provision of a threaded coupling between said shaft and said hub; and stop means comprising a member releasably affixed to said hub, extending over said hub opening, and disposed in abutting engagement with the end of said generally cylindrical shaft section, said stop means being effective to establish and maintain predetermined axial positioning of the threaded hub on the threaded shaft section.

2. A coupling according to claim 1, and characterized further in that said stop means disposed in abutting engagement with said shaft section comprises a plate releasably affixed to said hub.

3. A coupling according to claim 1, and characterized further in that said stop means disposed in abutting engagement with said shaft section comprises plug means threadedly retained in a second set of threads provided in the hub opening.

4. A coupling according to claim 3, and characterized in that each said helical coil and its matching grooves are of helical extent to the opposite hand as respects the helical extent of the helical threads on said plug means and its matching threads in said hub opening.

5. A torque transmissive shaft and hub assembly comprising: a shaft having an end and a generally cylindrical portion provided with a helical groove; means defining a hub having a generally cylindrical opening receiving said shaft cylindrical portion and having a helical groove matching the helical groove in said shaft cylindrical portion; each said shaft cylindrical portion and said hub opening including land areas of substantial extent between their respective grooves and disposed in close fitting engagement with one another; a helical wire coil threadedly received in said matching helical grooves in provision of a threaded coupling between said shaft and said hub; and stop means including a member releasably affixed to said hub, extending over said hub opening, and disposed in abutting engagement with said shaft end, said stop means being effective to react between said shaft end and said hub to establish and maintain predetermined axial positioning of the threaded hub section on the threaded shaft portion upon application of torque to said assembly in a direction tending to thread said hub onto said shaft.

* * * * *